United States Patent [19]

Macriss et al.

[11] Patent Number: 4,487,027

[45] Date of Patent: Dec. 11, 1984

[54] HYPERABSORPTION SPACE CONDITIONING PROCESS AND APPARATUS

[75] Inventors: Robert A. Macriss, Deerfield; Thomas S. Zawacki, Oak Park, both of Ill.

[73] Assignee: Institute of Gas Technology, Chicago, Ill.

[21] Appl. No.: 549,461

[22] Filed: Nov. 7, 1983

Related U.S. Application Data

[63] Continuation-in-part of Ser. No. 365,792, Apr. 5, 1982, Pat. No. 4,413,480.

[51] Int. Cl.³ ............................................. F25B 15/00
[52] U.S. Cl. ...................................... 62/112; 62/476; 62/480
[58] Field of Search .......................... 62/112, 476, 480

[56] References Cited

U.S. PATENT DOCUMENTS

| 3,783,631 | 1/1974 | Modahl et al. | 62/112 |
| 4,138,861 | 2/1979 | Jaroslav | 62/480 |
| 4,152,901 | 5/1979 | Munteri | 62/480 X |
| 4,373,347 | 2/1983 | Howell et al. | 62/238.6 X |

Primary Examiner—Lloyd L. King
Attorney, Agent, or Firm—Thomas W. Speckman

[57] ABSTRACT

A high efficiency space conditioning process and apparatus for heating and cooling utilizing an absorption cycle in the nature of absorption heat pumps for heating and cooling. The invention provides a process and apparatus having a higher Coefficient of Performance than conventional absorption heat pumps by utilization of a substantially saturated salt solution cycle between at least one pair of: (1) an absorber and generator, or (2) a condenser and evaporator, wherein the salt is crystallized to the solid phase in the generator or evaporator, respectively, and the heat of crystallization is utilized for refrigerant vaporization occurring simultaneously.

20 Claims, 2 Drawing Figures

HYPERABSORPTION SPACE CONDITIONING PROCESS AND APPARATUS

CROSS REFERENCE TO RELATED APPLICATION

This application is a continuation-in-part application of earlier filed copending application Ser. No. 365,792, filed Apr. 5, 1982 now U.S. Pat. No. 4,413,480.

BACKGROUND OF THE INVENTION

1. Field of the Invention

This invention relates to a high efficiency space conditioning process and apparatus for heating and cooling utilizing an absorption cycle in the nature of absorption heat pumps for heating and cooling. This invention provides a process and apparatus having higher Coefficient of Performance than conventional absorption heat pumps by utilization of a substantially saturated salt solution cycle between at least one pair of: (1) an absorber and generator, or (2) a condenser and evaporator, wherein the salt is crystallized to the solid phase in the generator or evaporator, respectively, and the heat of crystallization is utilized for refrigerant vaporization.

2. Description of the Prior Art

Absorption type air conditioning processes and apparatus have been known for providing cooling and heating for many years. However, the conventional absorption cycle has been recognized to have relatively low Coefficient of Performance for cooling and with the advent of higher efficiency gas fired furnace equipment, the Coefficient off Performance (COP) for heating of absorption-type heat pumps has also become only marginally better. Absorption air conditioners for cooling under optimized conditions represented by heat-source temperatures of about 200° to about 350° F. and heat-sink temperatures of about 85° to about 115° F. have demonstrated steady-state cooling COP of about 0.5 to about 0.7. Similarly, absorption heat pumps, currently under development and known to the present inventors, for heating under optimized conditions represented by heat-source temperatures in the generator of about 270° to about 360° F. and heat-sink temperatures in an outdoor coil of about 0° to 40° F., have demonstrated the laboratory steady-state heating COP of about 1.1 to about 1.2. Commercial absorpition cooling systems have used water-lithium bromide and ammonia-water refrigerant-absorbent fluids. Developmental absorption heating systems have used ammonia-water and ETFE-R133A (a proprietary composition of Allied Chemical Corporation) as the working fluid. There have been attempts to improve the conventional cycle efficiency of absorption-type, gas-fired heat pumps including:

operation at high generator temperatures to take advantage of cascading effects, commonly called double-effect systems; evaporative cooling of the absorber of air-cooled salt-water systems; and development of new absorption fluid systems. None of these attempts known to the inventors have been satisfactory due to one or more of the following reasons: high temperature corrosion of common materials of construction and the need for costly materials; undesired complexity of the process and apparatus; and only slightly superior performance coupled with the thermal and chemical instability of the fluid systems.

Prior art absorption refrigeration systems are well known as exemplified by U.S. Pat. No. 3,620,036 teaching that solidification or crystallization of the absorbent solution in an absorption refrigerations system should be avoided. U.S. Pat. No. 3,054,272 teaches an absorption refrigeration system using a saline solution as an absorbent and a refrigerant miscible therein, the capacity being adjusted by precipitating salt in the generator to decrease the capacity and permitting the solution to absorb precipitated salt to increase the system capacity. U.S. Pat. No. 2,986,525 teaches use of solids, such as lithium or ammonium nitrates and chlorides as absorbents for refrigerant gases in the generator of absorption refrigeration apparatus. Eutectoid particles form a solid, porous body which substantially fills the generator and absorbs about one half of its weight of ammonia charging the generator. The charged generator may then be incorporated into a refrigeration system and the discharge and absorption of gaseous ammonia cycled for the refrigeration cycle. U.S. Pat. No. 3,717,007 teaches an air-cooled double-effect salt solution absorption refrigeration system having high and low pressure generator stages utilizing an absorbent more dilute in salt content than absorbents normally employed to avoid formation of crystals. Other recent U.S. patents relating to absorption refrigeration systems include U.S. Pat. Nos. 4,014,183; 4,085,596; 4,171,619; 4,223,539 and 4,269,034.

SUMMARY OF THE INVENTION

The process and apparatus of this invention provides a new absorption cycle which we refer to as a hyperabsorption cycle. The hyperabsorption cycle of this invention involves crystallization of salt from a working fluid solution in at least one of (1) the generator and (2) the evaporator and solids dissolution in at least one of (1) the absorber and (2) the condenser, respectively, in combination with a convention condensation-vaporization-absorption cycle thermal conditioning (cooling and heating process). The heat of crystallization given off in the generator or evaporator is utilized in the concurrent vaporization of refrigerant. The process and apparatus of the present invention, contrary to the teachings of the prior art pointed out above, maintains a substantially saturated salt solution in a closed cycle between at least one pair of (1) the absorber and generator and (2) the condenser and evaporator.

In the first mode of operation, the substantially saturated salt solution is crystallized to form a solid phase salt in the generator, thereby giving off the heat of crystallization. The heat of crystallization is utilized to aid vaporization of the refrigerant liquid in the generator, both crystallization and vaporization taking place concurrently. A slurry of solid phase salt in salt solution is transported to the absorber which is maintained under conditions wherein the solid phase salt is dissolved to form the substantially saturated salt solution which is returned in the closed cycle to the generator. In the absorber, the refrigerant vapor is absorbed concurrently with dissolution of the solid phase salt.

In the second mode of operation, the substantially saturated salt solution is crystallized to form a solid phase salt in the evaporator, thereby giving off the heat of crystallization. The heat of crystallization is utilized to aid vaporization of the refrigerant liquid in the evaporator, both crystallization and vaporization taking place concurrently. A slurry of solid phase salt in salt solution is transported to the condenser which is maintained under conditions wherein the solid phase salt is dissolved to form the substantially saturated salt solution which is returned in the closed cycle to the evaporator. In the concenser, the refrigerant vapor is absorbed concurrently with dissolution of the solid phase salt. Salt solutions such as those used in conventional absorption-refrigerant cycles which exhibit suitable properties under temperature-pressure conditions of the absorber and generator may be used for recycling between the absorber and generator.

Suitable salts for recycle in the saturated salt working solutions are those having exothermic heats of crystallization and which exhibit suitable properties under temperature-pressure conditions of the (1) generator and absorber, or (2) evaporator and condenser, as appropriate. Salts such as calcium chloride, magnesium nitrate, and ammonium nitrate may be used in the systems of this invention. Potential steady-state cooling COP's of about 1 to about 2 and heating COP's of about 2 to about 4 have been estimated for specific salt and specific refrigerant systems operating under temperature conditions encountered with this cycle.

It is an object of this invention to provide a space conditioning apparatus and process having significantly higher Coefficient of Performance in both the heating and cooling mode than presently known systems.

It is yet another object of this invention to provide a space conditioning process and apparatus utilizing exothermic heat of crystallization of a salt solution to aid in the vaporization of a refrigerant.

It is still another object of this invention to provide a simplified closed cycle space conditioning process which is relatively non-corrosive.

It is still another object of this invention to provide a space conditioning process and apparatus of the absorption heat pump type which utilizes readily available and relatively inexpensive refrigerant and absorbent fluids.

BRIEF DESCRIPTION OF THE DRAWING

The above and other objects will become apparent upon reading the description and reference to the drawing showing preferred embodiments wherein.

DESCRIPTION OF PREFERRED EMBODIMENTS

An important aspect of the invention is provision for crystallization of solid phase salt from a saturated salt working solution and utilization of the exothermic heat of crystallization directly for vaporization of a refrigerant for passage to the condenser. A slurry of solid phase salt in liquid salt solution is passed in a first embodiment to the absorber and in a second embodiment to the condenser and dissolved in the working fluid forming a substantially saturated salt working solution concurrently with absorption or condensation, respectively, of refrigerant vapor. Suitable salts for use in the saturated salt working solution used in the process and apparatus of this invention are those exhibiting exothermic heats of crystallization and which also increase in solubility with temperature increases. By the term "crystallization" as used throughout the description and claims, we means formation of a solid phase which may be in the anhydrous or hydrated solids form. Likewise, the terminology "heat of crystallization" may, when hydrated solids are formed, include the heat of hydration. Utilizing the heat of crystallization from a working salt solution for vaporization of refrigerant results in obtaining cooling COP's in the range of 1 to 2 and heating COP's in the range of 2 to 4, significantly higher than presently obtained by absorption refrigeration space conditioning processes and apparatus.

Figure 1:
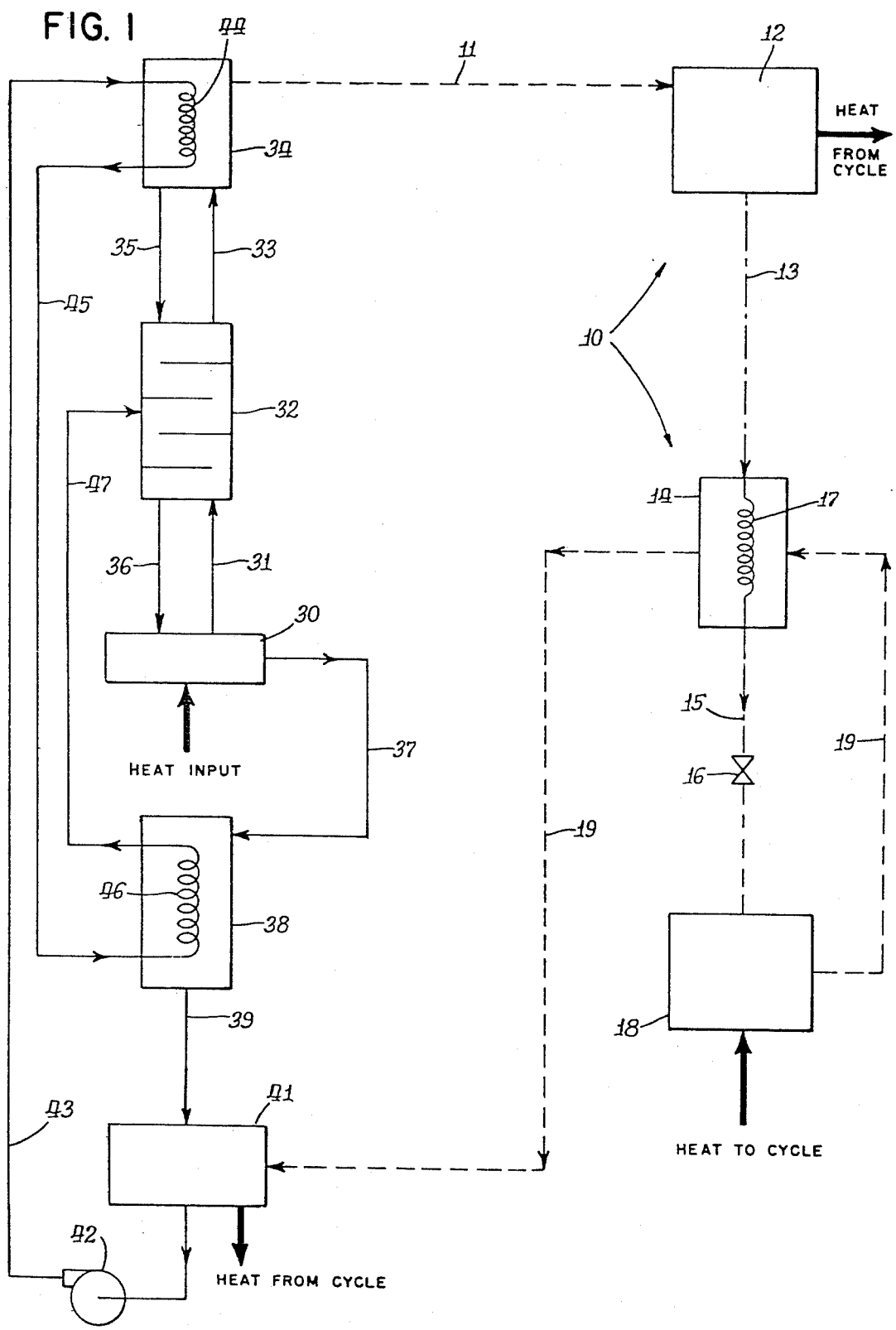
FIG. 1 shows a simplified schematic process and apparatus layout according to one embodiment of this invention utilizing solid phase salt transfer between the generator and the absorber.

Referring specifically to FIG. 1, there is shown a closed cycle space conditioning process and apparatus of the type of sequentially absorbing a refrigerant vapor in a liquid in absorber zone 41 with removal of heat energy from the cycle, passing the absorbed refrigerant vapor in the liquid to generator zone 30 which has a heat input causing vaporization of the refrigerant from the liquid, passing the refrigerant vapor to a conventional condenser zone 12 condensing the refrigerant vapor to a refrigerant liquid with removal of heat energy from the cycle, passing the condensed refrigerant liquid through pressure reduction zone 16 vaporizing the condensed liquid, passing the refrigerant vapor to a conventional evaporation zone 18 heating the refrigerant vapor by addition of heat energy to the cycle, and passing the heated refrigerant vapor to absorber zone 41 for repeat of the cycle. The process and apparatus may be used in a cooling mode by the cooling effect of evaporator 18 and in the heating mode by removal of heat from the cycle from condenser 12 and absorber 41. The heat input to generator 30 is provided from any suitable external heat source, such as by gas combustion.

An important feature of the improvement of this invention, as shown in FIG. 1, is sequentially in a closed cycle maintaining in absorber 41 a substantially saturated salt working solution of a salt having an exothermic heat of crystallization. As shown in the figure, the substantially saturated working solution together with absorbed refrigerant vapor may be passed from absorber 41 through conduit 43 by pump 42 to separator 32 and by conduit 36 to generator 30. The liquid stream may be raised in temperature in passage from absorber 41 to generator 30 by passing through thermal exchanger 44 of heat exchanger 34 and thermal exchanger 46 of heat exchanger 38 prior to entry by conduit 47 into separator 32. Separator 32 and heat exchanger 34 may not be necessary when the refrigerant vapor satisfactorily separates from the refrigerant absorption liquid without such separator means. Substantially saturated working solution and liquid with absorbed refrigerant vapor is passed from separator 32 by conduit 36 to generator 30. Solid phase salt is formed from the working solution exothermically in generator 30. The exothermic heat of crystallization is utilized for simultaneous vaporization of refrigerant from the liquid in which it is absorbed concurrently with the crystallization in generator 30. Utilization of the heat of crystallization directly for refrigerant vaporization reduces the requirement of external heat input to generator 30 and thereby increases the COP of the cycle, both in the heating and cooling modes.

The refrigerant vapor formed in generator 30 may be passed by conduit 31 to separator 32 wherein the refrigerant vapor is further stripped of any carry-over of absorbent liquid. Refrigerant vapor may be passed from separator 32 by conduit 33 to heat exchanger 34 for further stripping of the refrigerant vapor from any residual absorbent liquid and the refrigerant vapor passed by conduit 11 to condenser 12 and the absorbent liquid returned to generator 30. Separator 32 may be a suitable mass exchanger having contactor trays as schematically shown in FIG. 1.

Solid phase salts formed in generator 30 are passed, preferably in a liquid slurry of the solids, together with absorbent liquid, to absorber 41. The heated solid phase salt and heated absorbent liquid is passed through heat exchanger 38 to provide heat recovery to the stream passing from absorber 41 to generator 30. The solid phase salt and absorbent liquid is passed from heat exchanger 38 to absorber 41 through conduit 39.

In absorber 41 the solid phase salt is dissolved to form the substantially saturated salt working solution for recycle to generator 30 with the concurrent absorption of refrigerant vapor from evaporator 18 for passage to generator 30 in the absorbent liquid.

Suitable salts for use in this invention include inorganic salts such as ammonium nitrate, magnesium nitrate, calcium chloride, sodium thiocyanate, potassium thiocyanate, and lithium bromide. Suitable salts of organic derivates may be used such as potassium acetate, sodium acetate and potassium propionate. Ammonium nitrate is an example forming an anhydrous salt while magnesium nitrate and calcium chloride are examples of salts which may form hydrated salts. The important consideration in selection of the salt is the exothermic heat given off in the formation of the salt solids from a saturated salt solution.

A number of absorption refrigerant systems may be used in the process of this invention, such as ammonia-water, methanol-water and freons with straight chain glycol ethers.

The working salt solution returning to the generator and the refrigerant vapor absorption liquid passing to the absorber may be the same liquid, such as in aqueous saturated salt working solutions and ammonia-water or methanol-water refrigerant absorption systems, or they may be different liquids to obtain improved characteristics in each portion of the process in which the respective liquids function. Different liquids may be miscible or immiscible in each other and the selection of different liquids may be based upon increased absorption of refrigerant vapor in the absorption liquid and increased salt content in the substantially saturated salt working solution. By the terminology "substantially saturated salt working solution", as used throughout this description and in the claims, we mean a solution having a small amount of solids, operation on the solidus side of the saturated solution boundary resulting in too many solids and operation in the absence of solids reducing the desired effect of formation of solids from the solution. It is preferred to operate close to the saturated solution boundary over the temperature and pressure ranges involved. The evaporator temperature during the heating cycle is controlled by the outdoor ambient air temperatures while during the cooling cycle the evaporator temperature is limited by the indoor temperature conditions. The absorber temperatures are determined from the saturated salt working solution saturation curves at evaporator equilibrium pressure so that in the cooling mode the absorber temperatures are greater than the outdoor dry-bulb temperature, while in the heating mode, the absorber temperatures are greater than the indoor dry-bulb temperatures. The generator temperature and refrigerant composition are determined from the saturation curves for the saturated salt working solution on the basis of obtaining optimal COP. Corresponding condenser temperatures are then selected as required by the equilibrium vapor pressure of the refrigerant under the generator temperature conditions.

The condenser-evaporator portion 10 of the thermal conditioning cycle, as shown in FIG. 1, is the same as practiced in conventional absorption thermal conditioning processes and utilizes the same type of apparatus as do conventional processes. It is advantageous to pass the refrigerant vapor from evaporator 18 in thermal exchange relationship to thermal exchange 17 in precooler 14 to reduce the temperature of refrigerant liquid passing from condenser 12 to pressure reducer 16. After passage for thermal exchange in precooler 14, the refrigerant vapor is passed by conduit 19 to absorber 41 for recycle.

Figure 2:
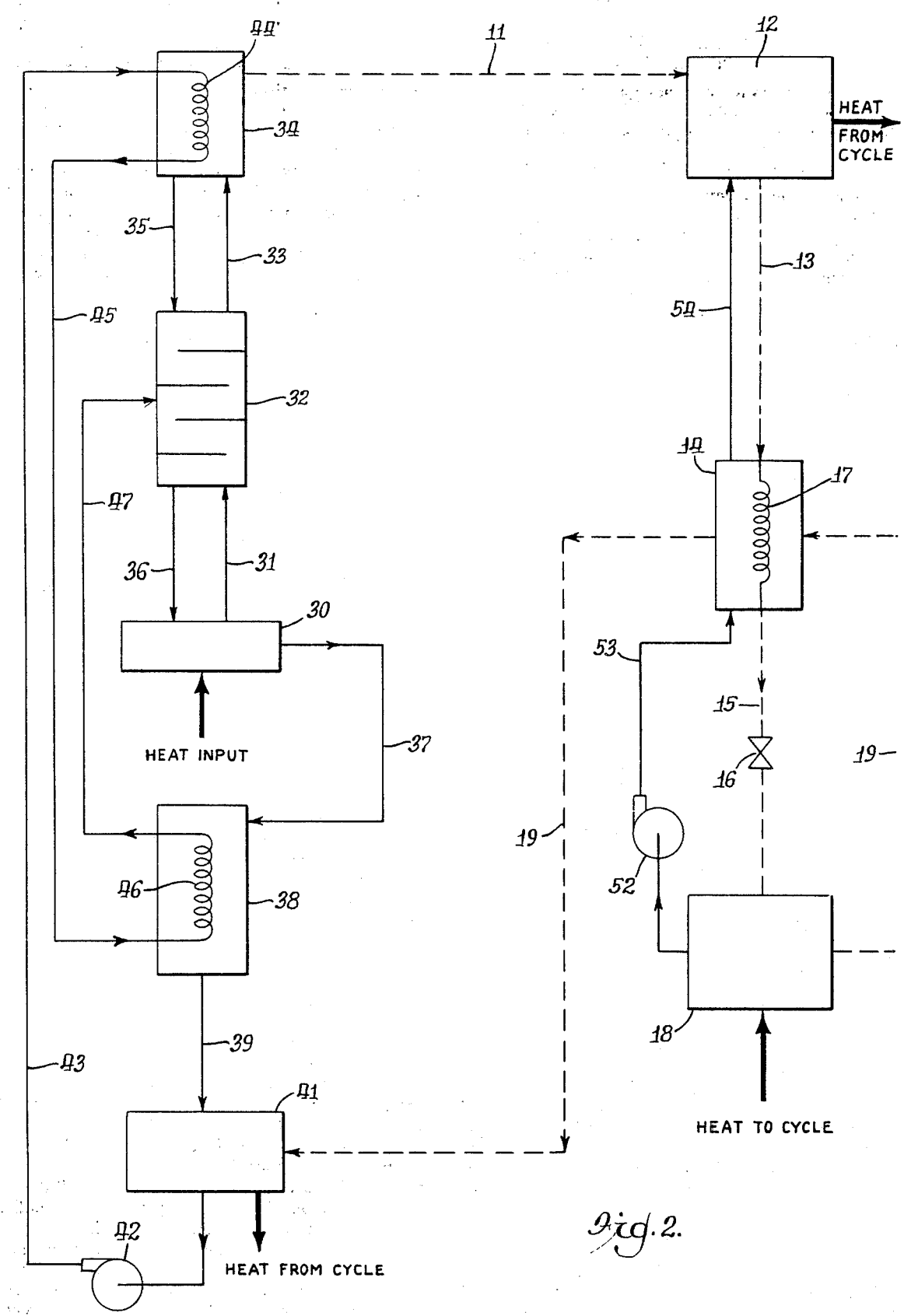
FIG. 2 shows a simplified schematic process and apparatus layout acording to one embodiment of this invention utilizing solid phase salt transfer between the evaporator and the condenser.

Referring specifically to FIG. 2, there is shown a closed cycle space conditioning process and apparatus of an absorption refrigerant type having functions of the refrigerant similar to those described above with respect to FIG. 1. The process and apparatus may likewise be used in a cooling mode by the cooling effect of evaporator 18 and in the heating mode by removal of heat from the cycle from condenser 12 and absorber 41. The heat input to generator 30 is provided from any suitable external heat source, such as by gas combustion.

In the embodiment shown in FIG. 2, a salt solution, as used in conventional absorption cycles, is recycled in a closed cycle between absorber 41 and generator 30. Recycle of the refrigerant absorbent non-saturated liquid stream as shown in FIG. 2, may pass through thermal exchanger 44 and thermal exchanger 46 as well as separator 32 in passing to generator 30.

An important feature of the improvement of this invention as shown in FIG. 1, is maintaining in evaporator 18 a substantially saturated salt working solution of a salt having an exothermic heat of crystallization. As shown in FIG. 2, the substantially saturated working solution passes from condenser 12 with refrigerant liquid through conduit 13, through thermal exchanger 17, through conduit 15 and pressure reducer 16 to evaporator 18. Solid phase salt is formed from the saturated working solution exothermically in evaporator 18. The exothermic heat of crystallization is utilized for simultaneous vaporization of refrigerant from the liquid in which it is absorbed concurrently with the crystallization in evaporator 18. Utilization of the heat of crystallization directly for refrigerant vaporization reduces the requirement of external heat input to evaporator 18 and thereby increases the COP of the cycle, both in the heating and cooling modes. The refrigerant vapor formed in evaporator 18 may be passed by conduit 19 to absorber 41 and the refrigerant passed to the condenser conducted in the usual manner for recycle through the absorber and generator as used in conventional refrigerant vapor-absorption space conditioning processes. In this cycle three phase equilibrium states occur in the evaporator and condenser, with vapor, liquid and solid present.

Suitable salts for use in the substantially saturated salt working solution, as pointed out above, are those having exothermic heat of crystallization. Likewise, a number of suitable absorption refrigerant systems have been disclosed above. In the process of the embodiment shown in FIG. 2, consideration must be given to the fluid pair, that is the saturated salt working solution and the refrigerant absorption solution.

In operation of the process shown in FIG. 2, utilizing saturated salt solution in the condenser and evaporator, the operating states of the components must lie on the three-phase saturation curve instead of the pure refrigerant line as in the process shown in FIG. 1. The ideal properties of the fluid pair are that: they form a stable composite absorbent-refrigerant solid (similar to the magnesium nitrate-water system); the solid salt phase must be stable along the downward leg of a pressure-temperature curve, in the temperature region suitable for heat pumping (temperature range of about $-17.8°$ to about $50°$ C., with vapor pressures over the solution of about 0.1 to about 5 atmospheres); and the slope of the pressure-temperature curve at the evaporator temperature (about $8.3°$ C.) should be such that the heat of simultaneous evaporation/crystallization is about 16700 calories per gram mol of refrigerant. While water solutions are referred to in the description and specific examples, primarily due to available data, it will be recognized that non-aqueous solutions may be most desirable in practice.

The cycle embodiment shown in FIG. 2 is of potential advantage since the condenser heat load may be relatively high while the generator heat load may be relatively low, by comparison with the cycle embodiment shown in FIG. 1.

Working salt solutions capable of forming a hydrated solid phase may be particularly suited for use in this invention. For illustration, in the case of salts which do not form a hydrated solid phase, as the equilibrium three-phase temperature is increased, the concentration of salt in solution and vapor pressure continually rise until increasing solution temperature results first in no change in vapor pressure and then in a rapid decrease as the temperature approaches the triple point of the pure salt. By comparison, in the case of salts which do form a hydrated solid phase, as the equilibrium three-phase temperature is increased the concentration of salt in solution is less than in the solid phase and a point is reached beyond which decreasing temperatures lower the vapor pressure resulting in a salt concentration in solution greater than in the solid phase. These characteristics may aid in increasing COP's for the hyperabsorption cycle of this invention, particularly as shown in FIG. 2.

While the above description teaches utilization of a substantially saturated salt solution cycle individually between the absorber and generator and the condenser and evaporator for utilization of the heat of crystallization for refrigerant vaporization, it is also readily apparent that these cycles may be combined with two cycles of saturated salt solutions.

Advantages of the present invention are illustrated in the following specific examples which are set forth for the purpose of illustration of preferred embodiments and should not be construed as limiting the invention.

EXAMPLE I

Calculations were made for heating and cooling cycles of the hyperabsorption system as shown in FIG. 1 using conventional ammonia-water absorption cycle condenser-evaporator cooling. A saturated solution of calcium chloride was considered as the working fluid cycling from the absorber to the generator and solid phase calcium chloride, $CaCl_2.2H_2O$, passed from the generator to the absorber. The refrigerant vapor produced in the generator was considered condensed at condenser pressure and flashed to low pressure in the evaporator to obtain the cooling effect. Steady-state COP's were calculated under Standard American Refrigeration Institute (ARI) conditions:

|  | Indoor Temperature | | Outdoor Temperature | |
| --- | --- | --- | --- | --- |
|  | Dry Bulb °C. | Wet Bulb | Dry Bulb °C. | Wet Bulb |
| Cooling | 26.7 | 19.4 | 35.0 | 23.9 |
| Heating | 21.1 | 15.6 | 8.3 | 6.1 |

During the heating cycle, the evaporator (outdoor coil) temperature was considered at the winter rated outdoor conditions of $8.3°$ C. and during the cooling cycle, the indoor coil (evaporator) temperature was considered at the indoor rated conditions of $26.7°$ C. The absorber temperatures were determined from the saturation curves at the evaporator equilibrium pressure so that, during the cooling cycle, the absorber temperature was $66.0°$ C. and during the heating cycle, the absorber temperature was considered to be $39.5°$ C. Using calcium chloride-water, the generator temperature, determined by saturation curves was $172°$ C. both for the cooling and heating cycles. The corresponding condenser temperature was selected to be $101.5°$ C. as required by the equilibrium vapor pressure in the generator. The calculated steady-state heating mode COP was 3.90 and the steady-state cooling mode COP was 1.95.

EXAMPLE II

Calculations were made under the same conditions as described in Example I except that a saturated solution of magnesium nitrate was considered as the working fluid cycling from the absorber to the generator and solid phase magnesium nitrate, $Mg(NO_3)_2.6H_2O$, passed from the generator to the absorber. The absorber temperatures were determined from the saturation curves at the evaporator equilibrium pressure so that, during the cooling cycle, the absorber temperature was $66.0°$ C. and during the heating cycle, the absorber temperature was considered to be $60.3°$ C. Using magnesium nitrate-water, the generator temperature, determined by saturation curves was $85.4°$ C. both for the cooling and heating cycles. The corresponding condenser temperature was selected to be $56.0°$ C. as required by the equilibrium vapor pressure in the generator. The calculated steady-state heating mode COP was 2.61 and the steady-state cooling mode COP was 1.01.

EXAMPLE III

Calculations were made for heating cycles of the hyperabsorption system as shown in FIG. 2 using lithium bromide-water solutions in the generator-absorber cycle and ammonium nitrate-water solutions in the evaporator-condenser cycle. In order to assess heat pumping performance, it was chosen to consider the condenser operating at $48.9°$ C., sufficiently high for heating house air, and the evaporator at $8.3°$ C., the mild ARI outdoor rating condition for heating equipment. Steady-state COP's were calculated under the standard ARI conditions set forth in Example I. The condenser and evaporator pressures were determined from temperature-vapor pressure curves of the fluid pair. The following component states of the system were obtained:

|            | Temp. °C. | Pressure mm Hg | Concentration Wt. % | Heat Load Cal/g-mol ref |
|------------|-----------|----------------|---------------------|-------------------------|
| Evaporator | 8.3       | 5.2            | 57                  | 9,500                   |
| Condenser  | 48.9      | 44.0           | 73                  | 10,000                  |
| Generator  | 86.7      | 44.0           | 63                  | 12,390                  |
| Absorber   | 40.6      | 5.2            | 61                  | 11,900                  |

Under the above conditions the heating COP was 1.77. Under similar conditions, calculations for the cycle shown in FIG. 1 showed a heating COP of 1.3.

EXAMPLE IV

Calculations were made for heating cycles of the hyperabsorption system as shown in FIG. 2 in the same manner as Example III only using magnesium nitrate-water solutions in the evaporator-condenser cycle. The following component states of the system were obtained:

|            | Temp. °C. | Pressure mm Hg | Concentration Wt. % | Heat Load Cal/g-mol ref |
|------------|-----------|----------------|---------------------|-------------------------|
| Evaporator | 8.3       | 5.2            | 40                  | 9,500                   |
| Condenser  | 48.9      | 44.0           | 45                  | 10,000                  |
| Generator  | 86.7      | 44.0           | 63                  | 12,390                  |
| Absorber   | 40.6      | 5.2            | 61                  | 11,900                  |

Under the above conditions, the heating COP was 1.77.

EXAMPLE V

Calculations were made for heating cycles of the hyperabsorption system as shown in FIG. 2 in the same manner as Example III using a hypothetical salt solution in the evaporator-condenser cycle. The properties of the hypothetical pair, comprising the hypothetical salt solution and lithium bromide-water solution were considered that: the pair must form a stable composite absorbent-refrigerant solid similar to the magnesium nitrate-water system; the solid phase must be stable along the downward leg of the pressure-temperature curve, in the temperature region of interest of heat pumping, $-17.8°$ to $50°$ C.; the vapor pressures over the solution should be in the range of 0.1 to 5 atmospheres; and the slope of the P-T curve at the evaporator temperature $8.3°$ C. should be such that the heat of simultaneous evaporation/crystallization is about 16,700 cal/g-mol of refrigerant. The following component states of the system were:

|            | Temp. °C. | Pressure mm Hg | Concentration Wt. % | Heat Load Cal/g-mol ref |
|------------|-----------|----------------|---------------------|-------------------------|
| Evaporator | 8.3       | 10             | —                   | 16,100                  |
| Condenser  | 48.9      | 560            | —                   | 16,700                  |
| Generator  | 154.4     | 560            | 63                  | 12,600                  |
| Absorber   | 51.7      | 10             | 61                  | 11,900                  |

Under the above conditions, the heating COP was 2.23.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a closed cycle space conditioning process of the type comprising the steps of sequentially absorbing a refrigerant vapor in a liquid in an absorber zone with removal of heat energy from the cycle, passing said absorbed refrigerant vapor in said liquid to a generator zone and heating said absorbed refrigerant vapor in said liquid causing vaporization freeing said refrigerant vapor from liquid, passing said refrigerant vapor to a condenser zone condensing said refrigerant vapor to a refrigerant liquid with removal of heat energy from the cycle, passing said condensed refrigerant liquid through a pressure reduction zone vaporizing said condensed liquid, passing said refrigerant vapor to an evaporator zone and heating said refrigerant vapor by addition of heat energy to the cycle, and passing said heated refrigerant vapor to said absorber zone for repeat of the cycle, the improvement comprising:

maintaining in a closed cycle a substantially saturated salt working solution of a salt having an exothermic heat of crystallization between at least one pair of (1) said absorber and said generator and (2) said condenser and said evaporator, passing a slurry of solid phase of said salt in a solution of said salt to at least one of said absorber and condenser of said pair(s) wherein said solid phase salt is dissolved to form said substantially saturated salt working solution, and passing said substantially saturated salt working solution to at least one of said generator and evaporator of said pair(s) wherein crystallization of said salt from said working solution to form a solid phase salt produces exothermic heat of said crystallization which is utilized to aid said refrigerant vaporization.

2. The process of claim 1 wherein said working salt solution returning to at least one of said generator and said evaporator and the refrigerant vapor absorption liquid passing to said absorber comprise the same liquid.

3. The process of claim 1 wherein said working salt solution returning to at least one of said generator and said evaporator and the refrigerant vapor absorption liquid passing to said absorber comprise different liquids.

4. The process of claim 1 wherein said salt is an inorganic salt selected from the group consisting of ammonium nitrate, magnesium nitrate, calcium chloride, sodium thiocyanate, potassium thiocyanate and lithium bromide.

5. The process of claim 1 wherein said salt is an organic salt selected from the group consisting of potassium acetate, sodium acetate and potassium propionate.

6. The process of claim 1 wherein said absorption refrigerant system is selected from the group consisting of ammonia-water, methanol-water and freon-straight chain glycol ether.

7. The process of claim 1 wherein said refrigerant vapor absorbed in said absorbing liquid are passed in thermal exchange with the refrigerant output of said generator to further separate said refrigerant vapor from said absorbing liquid.

8. The process of claim 1 wherein said refrigerant vapor absorbed in said absorbing liquid are passed in thermal exchange with said absorbing liquid passing from said generator to said absorber.

9. The process of claim 1 wherein said refrigerant vapor passing from said generator to said condenser passes through at least one separator to further separate refrigerant vapor from absorbing liquid.

10. The process of claim 1 wherein said substantially saturated salt working solution is maintained in said closed cycle between said condenser and said evaporator.

11. The process of claim 10 wherein said slurry of solid phase salt in said working solution is passed through a pressure increaseing means prior to entering said condenser.

12. The process of claim 10 wherein said substantially saturated salt working solution is passed through a pressure reducing means prior to entering said evaporator.

13. The process of claim 10 wherein said solid phase salt in said working solution is passed through a pressure increasing means prior to entering said condenser and said substantially saturated salt working solution is passed through a pressure reducing means prior to entering said evaporator.

14. The process of claim 13 wherein solely a refrigerant absorbent liquid with associated refrigerant is passed in closed cycle between said generator and absorber.

15. The process of claim 10 wherein solely a refrigerant absorbent liquid with associated refrigerant is passed in closed cycle between said generator and absorber.

16. The process of claim 10 wherein a second substantially saturated salt working solution is additionally maintained in a second closed cycle between said generator and said absorber.

17. In a closed cycle space conditioning apparatus of the absorption refrigeration type having in sequence an absorber means, generator means, condenser means and evaporator means, the improvement comprising:
   said condenser means capable of removal of heat energy from the cycle and simultaneous absorption of a refrigerant vapor and dissolution of solid phase salt to form a substantially saturated salt working solution, said salt having an exothermic heat of crystallization;
   first passage means capable of transporting said absorbed refrigerant vapor and said substantially saturated salt working solution from said condenser means to said evaporator means;
   said evaporator means capable of addition of heat energy to the cycle and simultaneous crystallization of said salt from said substantially saturated working solution to said solid phase salt and vaporization of said absorbed refrigerant vapor by utilization of said exothermic heat of crystallization; and
   second passage means capable of transporting a slurry of said solid phase salt from said evaporator means to said condenser means for recycle.

18. The apparatus of claim 17 wherein said first passage means comprises pressure reducing means and said second passage means comprises pressure increasing means.

19. A closed cycle space conditioning apparatus of the absorption refrigerant type having in sequence an absorber means, generator means, condenser means and evaporator means comrpsing:
   condenser means capable of condensing refrigerant vapor to refrigerant liquid, removal of heat energy from the cycle, and simultaneous dissolution of solid phase salt to form a substantially saturated salt working solution, said salt having an exothermic heat of crystallization;
   first passage means capable of transporting said absorbed refrigerant vapor and substantially saturated salt working solution from said condenser means to said evaporator means;
   evaporator means capable of addition of heat energy to the cycle and simultaneous crystallization of said salt from said substantially saturated working solution to said solid phase salt and pressure reduction vaporization of said absorbed refrigerant vapor additionally utilizing said exothermic heat of crystallization;
   second passage means capable of transporting a slurry of said solid phase salt from said evaporator, means to said condenser means for recycle;
   third passage means capable of transporting said refrigerant vapor from said evaporator means to said absorber means;
   absorber means capable of absorption of said refrigerant vapor in a refrigerant absorbent liquid with removal of heat energy from said closed cycle;
   fourth passage means capable of transporting said refrigerant absorbed in said absorbent liquid from said absorber means to said generator means;
   generator means capable of vaporization of said absorbed refrigerant vapor and addition of heat energy to the cycle; and
   fifth passage means capable of transporting said refrigerant vapor to said condenser means for recycle.

20. The apparatus of claim 19 wherein said fourth passage means comprises a thermal exchanger in thermal exchange with said third passage means for further separation of said refrigerant vapor and additionally comprises passage means capable of returning liquid removed from said third passage means to said generator.

* * * * *